US010990955B2

(12) United States Patent
Skelsey et al.

(10) Patent No.: US 10,990,955 B2
(45) Date of Patent: Apr. 27, 2021

(54) METHOD AND SYSTEM FOR CONTACTLESS WITHDRAWAL FROM AN ATM

(71) Applicant: MASTERCARD INTERNATIONAL INCORPORATED, Purchase, NY (US)

(72) Inventors: Susan Skelsey, New York, NY (US); Stephane Wyper, Woodland Hills, CA (US); Peter Balsavias, Creve Coeur, MO (US); Kelley McDermott, Monroe, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/408,954

(22) Filed: May 10, 2019

(65) Prior Publication Data

US 2019/0347643 A1 Nov. 14, 2019

Related U.S. Application Data

(60) Provisional application No. 62/670,335, filed on May 11, 2018.

(51) Int. Cl.
*G06Q 20/32* (2012.01)
*G06Q 20/10* (2012.01)
(Continued)

(52) U.S. Cl.
CPC ..... *G06Q 20/3224* (2013.01); *G06Q 20/1085* (2013.01); *G06Q 20/3223* (2013.01);
(Continued)

(58) Field of Classification Search
CPC ................................. G06Q 20/3224
See application file for complete search history.

(56) References Cited

U.S. PATENT DOCUMENTS 8,566,203 B1 10/2013 Vieira et al.
9,432,804 B2 8/2016 Hanson et al.
(Continued)

FOREIGN PATENT DOCUMENTS

WO 2017/120518 A1 7/2017

OTHER PUBLICATIONS

Office Action dated Mar. 13, 2020, by the Canadian Intellectual Property Office in corresponding Canada Patent Application No. 3,045,801. (6 pages).
(Continued)

*Primary Examiner* — Scott C Anderson
(74) *Attorney, Agent, or Firm* — Buchanan Ingersoll & Rooney PC

(57) ABSTRACT

A method for contactless withdrawal at an automated teller machine includes: receiving, by a receiver of a computing device, a first signal indicating proximity to a first predetermined geographic location; displaying, by a display interfaced with the computing device, a prompt associated with the predetermined geographic location; receiving, by an input device interfaced with the computing device, one or more parameters and a credential selection; receiving, by the computing device, a second signal indicating proximity to a second predetermined geographic location; and transmitting, by a transmitter of the computing device, at least the one or more parameters and credentials associated with the credential selection to an automated teller machine located at the second predetermined geographic location.

19 Claims, 5 Drawing Sheets

(51) Int. Cl.
H04W 4/80 (2018.01)
H04W 4/021 (2018.01)

(52) U.S. Cl.
CPC ........ *G06Q 20/3278* (2013.01); *H04W 4/021* (2013.01); *H04W 4/80* (2018.02)

(56) References Cited

U.S. PATENT DOCUMENTS

| | | | | |
|---|---|---|---|---|
| 2012/0197797 A1* | 8/2012 | Grigg | ...................... | G07F 19/20 |
| | | | | 705/43 |
| 2014/0046842 A1* | 2/2014 | Irudayam | ........... | G06Q 20/3223 |
| | | | | 705/43 |
| 2014/0279490 A1* | 9/2014 | Calman | .................. | G06Q 20/40 |
| | | | | 705/43 |
| 2015/0294296 A1* | 10/2015 | Koeppel | ................ | G07F 19/20 |
| | | | | 705/35 |
| 2018/0114222 A1* | 4/2018 | Furey | ...................... | G07F 19/20 |

OTHER PUBLICATIONS

Office Action dated Jan. 13, 2021, by the Canadian Intellectual Property Office in corresponding Canadian Patent Application No. 3,045,801. (7 pages).

* cited by examiner

METHOD AND SYSTEM FOR CONTACTLESS WITHDRAWAL FROM AN ATM

FIELD

The present disclosure relates to performing a withdrawal at an automated teller machine (ATM) through a vehicle application environment without having physical contact with the ATM using a contactless interface of the vehicle application environment as well as geographic location information of the vehicle.

BACKGROUND

Automated teller machines (ATMs) were created to provide customers of financial institutions with greater convenience. Rather than having to find a branch, go inside of the branch, wait for a teller, and supply paperwork in order to make a withdrawal from an account, a customer could go to an ATM, insert their card, and make a few quick selections to receive their cash and be on their way. The size and self-service nature of ATMs made them significantly more accessible and convenient for customers than traditional brick and mortar branches.

However, ATMs are not without their flaws. Most notably, skimming devices have become more sophisticated over time, often being undetectable to many customers who have their account details compromised when using an ATM. Less dangerous but no less inconvenient, ATMs that require a card be physically inserted often pose a risk that the customer may inadvertently leave their card at the ATM. In addition, foreign travelers may desire the use of an ATM but be unfamiliar with the local language and may thus struggle to make a withdrawal.

Some solutions have been created to enable a customer to make a withdrawal from an ATM without presenting their credit card. Such solutions may protect the customer against leaving their card, and, in some implementations, may be useful against skimming, but still require the customer to perform actions on the ATM itself. As such, these solutions still rely on the customer being able to understand the available languages for the ATM and may still take significant time for operation thereof.

Thus, there is a need for a technical solution to enable a completely contactless withdrawal experience at an ATM that requires little, or in some cases no, input on the ATM itself on the part of the customer.

SUMMARY

The present disclosure provides a description of systems and methods for contactless withdrawal at an automated teller machine (ATM). When a vehicle approaches an area that includes an ATM, a user of the vehicle may be prompted to see if they would like to use the ATM through a vehicle application environment, which may be the vehicle itself (e.g., via an onboard computing device) or a computing device in the user's possession (e.g., a smart phone, wearable computing device, etc.). The user responds via the vehicle application environment with details for a cash withdrawal or other desired ATM transaction. As the vehicle approaches the ATM itself, detected via suitable detection means, the vehicle application environment provides the transaction details and account credentials directly to the ATM via a contactless method. The ATM can then immediately proceed with the transaction, without requiring the user to interact directly with the ATM in any manner. As a result, the vehicle application environment replaces use of the ATM, while the location detection of the vehicle provides a greater level of convenience as the user's participation can be started before they have even arrived at the ATM. Thus, ATM transactions are faster, more convenient, can be done without the danger of any user input being skimmed, and enable a user to provide their selections in their desired language via their vehicle application environment, without being restricted to available languages on the ATM.

A method includes: receiving, by a receiver of a computing device, a first signal indicating proximity to a first predetermined geographic location; displaying, by a display interfaced with the computing device, a prompt associated with the predetermined geographic location; receiving, by an input device interfaced with the computing device, one or more parameters and a credential selection; receiving, by the computing device, a second signal indicating proximity to a second predetermined geographic location; and transmitting, by a transmitter of the computing device, at least the one or more parameters and credentials associated with the credential selection to an automated teller machine located at the second predetermined geographic location.

A system includes: a receiver of a computing device configured to receive a first signal indicating proximity to a first predetermined geographic location; a display interfaced with the computing device configured to display a prompt associated with the predetermined geographic location; an input device interfaced with the computing device configured to receive one or more parameters and a credential selection; the computing device configured to receive a second signal indicating proximity to a second predetermined geographic location; and a transmitter of the computing device configured to transmit at least the one or more parameters and credentials associated with the credential selection to an automated teller machine located at the second predetermined geographic location.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
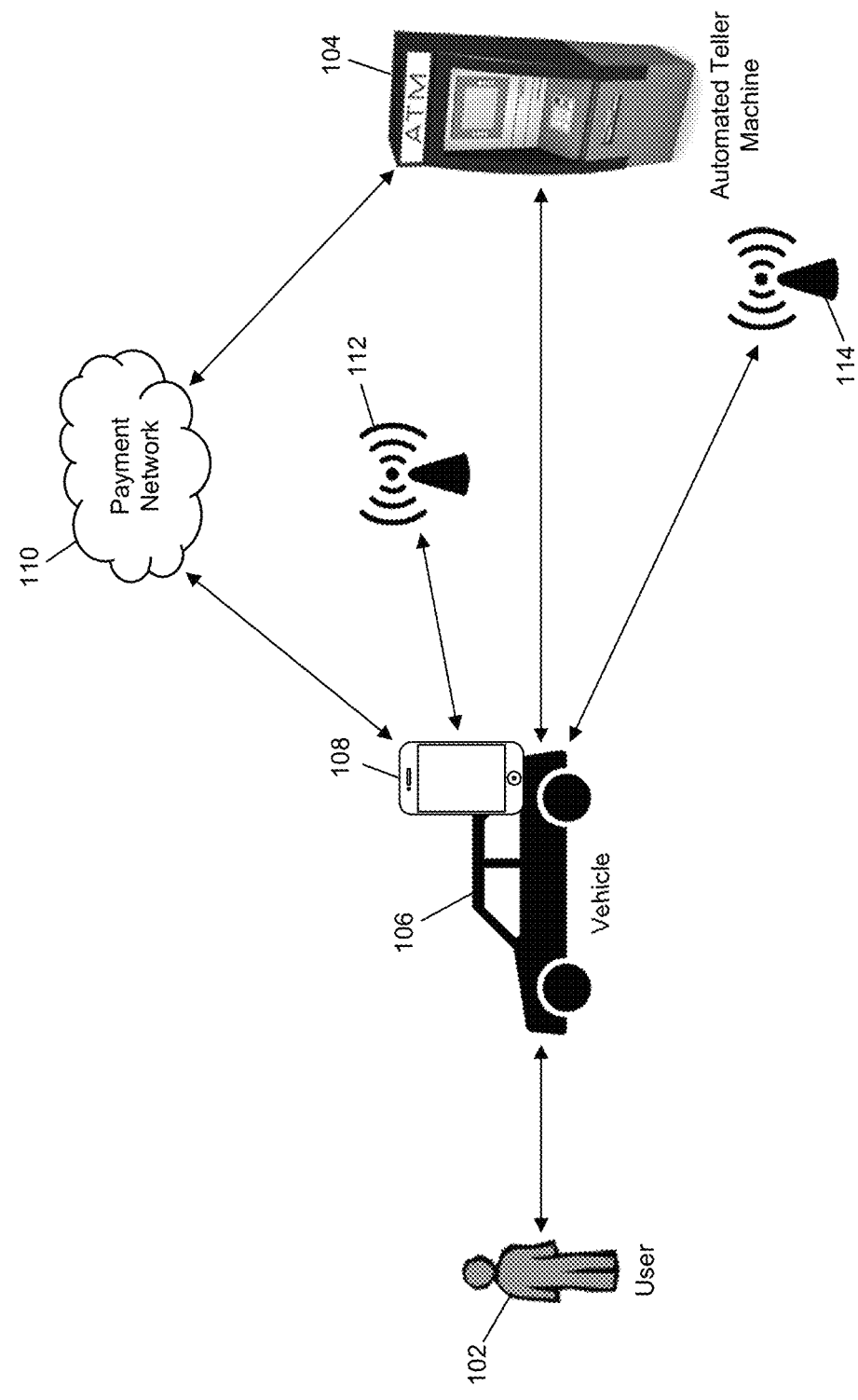
FIG. 1 is a block diagram illustrating a high level system architecture for performing a contactless withdrawal at an ATM in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Contactless ATM Withdrawals

FIG. 1 illustrates a system 100 for contactless withdrawals at an automated teller machine (ATM) through the use of a vehicle application environment and geographic location detection.

In the system 100, a user may have a need to use an ATM 104 for a transaction therewith, such as to make a cash withdrawal, cash or check deposit, cash advance, balance inquiry, or other ATM transaction. Traditionally, the user 102 would approach the ATM 104, insert their payment card, make selections on the ATM 104, and complete the transaction (e.g., receiving money dispensed by the ATM, if applicable). In the system 100, the user 102 may be operating or otherwise be located in (e.g., as a passenger) a vehicle 106. The vehicle 106 may be equipped with a computing device 108. The computing device 108, discussed in more detail below, may be a physical part of the vehicle 106, such as an on-board computing system, aftermarket device interfaced with the vehicle 106, etc., or may be a separate computing device 108 that is located within the vehicle 106, such as a computing device in the user's possession, such as a cellular phone, smart phone, smart watch, wearable computing device, tablet computer, etc.

The computing device 108 may be configured to provide a vehicle application environment to the user 102. The vehicle application environment may provide the user 102 with an interface to perform the functions discussed herein, such as making selections for a desired ATM transaction, transmitting data to the ATM 104 to facilitate the desired ATM transaction, prompting the user 102 for information, etc. The vehicle application environment may use suitable display devices and input devices interfaced with the computing device 108 for interaction with the user 102, where such display devices and input devices may be based on the capabilities of the vehicle 106 and/or computing device 108. For instance, if the computing device 108 is a part of the vehicle 106, the vehicle application environment may use an existing heads-up display in the vehicle as a display device and use a microphone and/or other input mechanism as an input device. In another example, if the computing device 108 is the user's smart phone, a capacitive touch display may serve as both the display device and input device for the vehicle application environment.

In the system 100, the user 102 may be prompted by the vehicle application environment to determine if an ATM transaction is detected when the vehicle 106 approaches a predetermined geographic area that includes or is otherwise associated with the ATM 104. For instance, if the ATM 104 is located at a bank branch, the premises of the bank branch and/or the surrounding streets may define the geographic area. Approach to the geographic area may be identified using any suitable method. In one embodiment, the computing device 108 may report its geographic location to an external system, such as the ATM 104 or a third party system, which may transmit a notification to the computing device 108 once it arrives at the predetermined geographic area. In another embodiment, the computing device 108 may have the predefined geographic area stored therein or otherwise available thereto, and may identify its geographic location and prompt the user 102 once it detects that it has arrived at the predefined geographic area.

In another embodiment, a beacon 112 may be located in or near the predefined geographic area. In one further embodiment, the beacon 112 may broadcast a signal that may be received by the computing device 108, which may indicate to the computing device 108 that is approaching the geographic area associated with the ATM 104 to initiate the prompt to the user 102. In another further embodiment, the beacon 112 may detect arrival of the vehicle 106 in the predefined geographic area and may transmit a signal directly to the computing device 108 to initiate the prompt. In such embodiments, the detection of the vehicle 106 may be made through proximity sensors, receipt of a signal broadcast by the computing device 108, or other suitable method.

The computing device 108 may, through the vehicle application environment 108, prompt the user 102 using the display device (e.g., or other suitable output device, such as a speaker configured to emit sounds to the user 102) to determine if the user 102 would like to conduct a transaction at the nearby ATM 104. The user 102 may, using the input device interfaced with the vehicle application environment, indicate a desire to conduct the transaction and then proceed to make selections related to the transaction. The selections may include the selection of a transaction account to use for the ATM transaction and a type of transaction to be conducted, as well as any other selections that may be based on the type of transaction. For instance, no more selections may be necessary for a balance inquiry, but an amount may need to be provided for a cash withdrawal.

As the user 102 makes the selections, the vehicle 106 may approach the ATM 104. Once the vehicle 106 has arrived at a second predefined geographic area located within proximity of the ATM 104 itself, the computing device 108 may be instructed to electronically transmit the transaction selections to the ATM 104. The vehicle 106 may be identified as arriving at the ATM 104 (e.g., the second predefined geographic area) using the same method as used to identify the vehicle 106 approaching the first geographic area, or a different method, such as described above. For example, in some embodiments, a second beacon 114 may be located in or associated with the second predefined geographic area and used to detect arrival of the vehicle 106 at the ATM 104. In some cases, a plurality of beacons 114 may be used to perform triangulation to determine an accurate position of the vehicle 106 to determine when the vehicle 106 has arrived at the ATM 104. For example, for a drive-through ATM 104, the vehicle 106 may not be considered to be in the second geographic area until the vehicle 106 has pulled up to the ATM 104 in a suitable location to receive dispensed cash, where the precise location may be identified through triangulation from a series of beacons 114, or by detection of a beacon 114 with a short enough range to have a suitable degree of certainty of the vehicle's position. In some embodiments, the ATM 104 itself may serve as the beacon 114.

Once the vehicle 106 is at the ATM 104, the computing device 108 may initiate an electronic, contactless transmission of the transaction selections to the ATM 104. In one embodiment, the transmission may be initiated by the user 102. For instance, once the vehicle 106 arrives at the ATM 104, the user 102 may instruct (e.g., via the input device of the vehicle application environment) the computing device 108 to perform the transmission. In another embodiment, the detection of the computing vehicle 106 being at the second predefined geographic area may initiate the transmission from the computing device 108. For example, the computing device 108 may initiate transmission once a signal has been received from the beacon 114. In some cases, the beacon 114 may emit a signal that includes a communication address associated with the ATM 104, where the computing device 108 may direct the transmission to the ATM 104 using the supplied communication address.

The transmission may be made from the computing device 108 to the ATM 104 using any suitable method. For instance, in one embodiment, the computing device 108 may electronically transmit a signal to the ATM 104 using near field communication, where the signal is encoded with the transaction selections. In another embodiment, the computing device 108 may display a machine-readable code that is encoded with the transaction selections, which may be read by the ATM 104 to obtain the day encoded therein. In yet another embodiment, the transaction selections may be encoded in an audio signal emitted by the computing device 108 that is received by a microphone of the ATM 104 and decoded therefrom. In still another embodiment, the computing device 108 may electronically transmit the signal to the ATM 104 using another contactless communication method, such as via radio frequency, Bluetooth, a local area network, etc.

The transaction selections may include the transaction type, any additional information related to the transaction type (e.g., withdrawal amount, deposit amount, check number, etc.), and account credentials. In some embodiments, the account credentials may include the payment credentials associated with a transaction account that would be read from the corresponding credit card (e.g., or other payment instrument) in a traditional ATM transaction, such as the primary account number, expiration date, security code, account holder name, etc. In other embodiments, the account credentials may include at least a unique identifier associated with the transaction account and any necessary authentication data. In such an embodiment, the ATM 104 may be configured to use the account credentials in place of traditional payment credentials. In some cases, the account credentials may replace the traditional payment credentials in a transaction message submitted for processing. In other cases, the ATM 104 may be configured to obtain the payment credentials using the account credentials, such as by contacting the issuing financial institution associated with the transaction account or a third party service provider, such as a payment network 110 that is configured to provide payment credentials upon approval by the user 102 (e.g., via the computing device 108).

Once the ATM 104 has the transaction selections and suitable credentials, the ATM 104 may initiate the ATM transaction using standard methods and systems. In some cases, the ATM transaction may be processed via the use of a payment network 110. In such cases, the ATM 104 (e.g., or an entity operating on behalf of the ATM 104, such as a financial institution, gateway processor, etc.) may submit a transaction message to the payment network 110 via payment rails associated therewith, where the transaction message may be a specially formatted data message that is formatted according to one or more standards governing the exchange of financial transaction messages, such as the International Organization of Standardization's ISO 8583 or ISO 20022 standards. Once the transaction is complete, the ATM 104 may provide the user 102 with any required cash or other product, such as a receipt for a deposit or balance inquiry.

The methods and systems discussed herein thus enable a user 102 to make a withdrawal or other transaction with an ATM 104 without having to directly interact with the ATM 104 and performing all functions through their vehicle application environment, which may reduce the ability for a nefarious actor to skim any details from the user 102 and allow the user 102 to make their transaction selections in their own language and manner of entry, which may be of greater convenience for users with disabilities. In addition, the use of geographic location detection can also increase the convenience for users 102 by allowing a user 102 to make selections prior to arriving at the ATM 104 to save time, particularly in cases where the user 102 may be waiting in line to use the ATM 104 and can make their selections while they wait.

Computing Device

Figure 2:
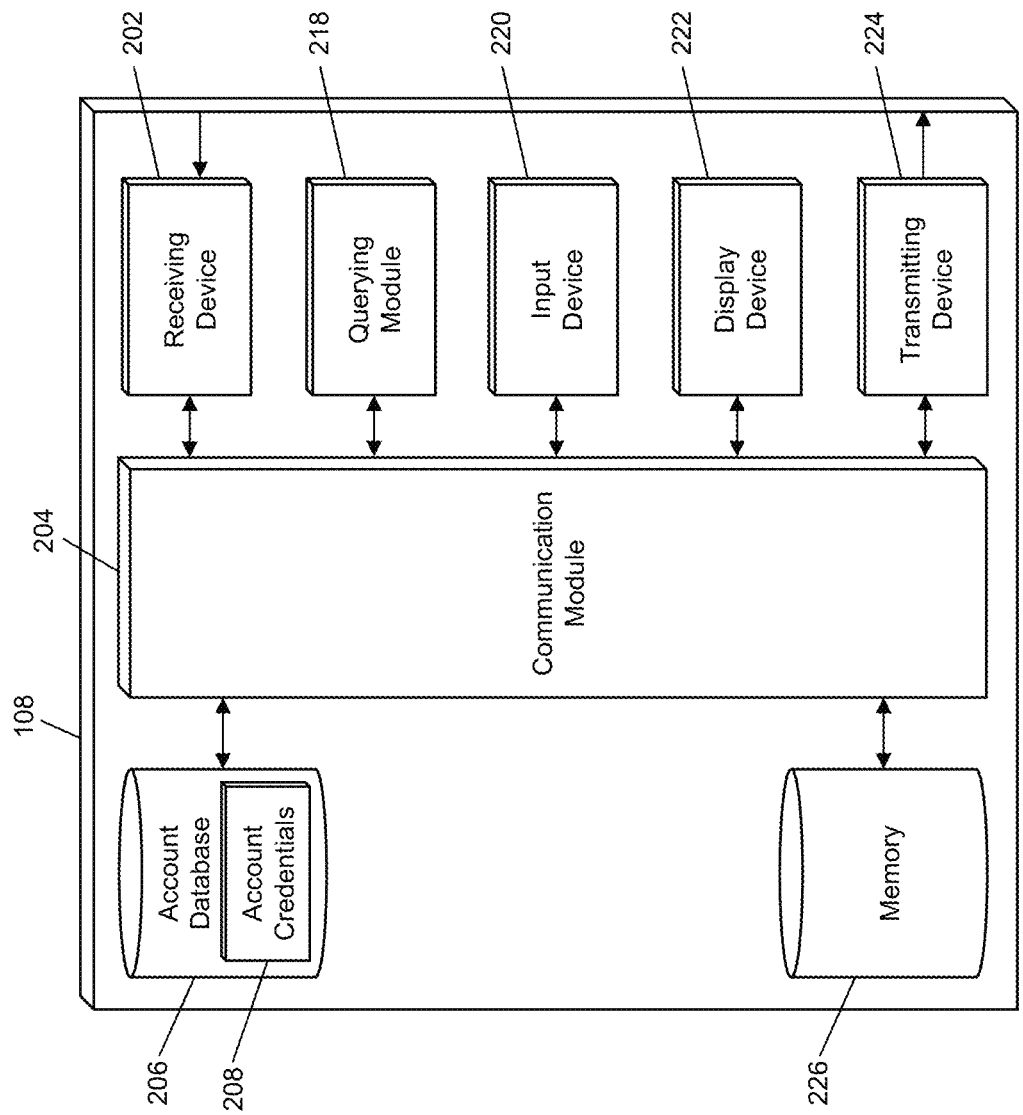
FIG. 2 is a block diagram illustrating the computing device of the system of FIG. 1 for use in a contactless withdrawal at an ATM in accordance with exemplary embodiments.

FIG. 2 illustrates an embodiment of a computing device 108 in the system 100. It will be apparent to persons having skill in the relevant art that the embodiment of the computing device 108 illustrated in FIG. 2 is provided as illustration only and may not be exhaustive to all possible configurations of the computing device 108 suitable for performing the functions as discussed herein. For example, the computer system 500 illustrated in FIG. 5 and discussed in more detail below may be a suitable configuration of the computing device 108.

The computing device 108 may include a receiving device 202. The receiving device 202 may be configured to receive data over one or more networks via one or more network protocols. In some instances, the receiving device 202 may be configured to receive data from ATMs 104, beacons 112 and 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by beacons 112 or 114 or other third party systems that may be superimposed or otherwise encoded with indications of approach by the vehicle 106 to a predefined geographic area. In some cases, the receiving device 202 may be configured to receive data signals that are superimposed with a geographic location of the vehicle 106 (e.g., or computing device 108, as applicable) and/or predefined geographic areas for use in performing the functions discussed herein.

The computing device 108 may also include a communication module 204. The communication module 204 may be configured to transmit data between modules, engines, databases, memories, and other components of the computing device 108 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 108 and external components of the computing device 108, such as externally connected databases, display devices, input devices, etc. The computing device 108 may also include a processing device. The processing device may be configured to perform the functions of the computing device 108 discussed herein as will be apparent to persons having skill in the relevant art. In some embodiments, the processing device may include and/or be comprised of a plurality of engines and/or modules specially configured to perform one or more functions of the processing device, such as a querying module 218. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the computing device 108 may include an account database 206. The account database 206 may be configured to store one or more account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account, such as may include account credentials, payment credentials, a unique identifier for use in selecting a transaction account, etc.

The computing device 108 may include a querying module 218. The querying module 218 may be configured to execute queries on databases to identify information. The querying module 218 may receive one or more data values or query strings, and may execute a query string based thereon on an indicated database, such as the merchant database 206, to identify information stored therein. The querying module 218 may then output the identified information to an appropriate engine or module of the computing device 108 as necessary. The querying module 218 may, for example, execute a query on the account database 206 to identify account credentials following a selection made by the user 102 for selection of a transaction account to use in a desired ATM transaction.

The computing device 108 may also include or be otherwise interfaced with one or more input devices 220. The input devices 220 may be internal to the computing device 108 or external to the computing device 108 and connected thereto via one or more connections (e.g., wired or wireless) for the transmission of data to and/or from. The input devices 220 may be configured to receive input from a user of the computing device 108, which may be provided to another module or engine of the computing device 108 (e.g., via the communication module 204) for processing accordingly. Input devices 220 may include any type of input device suitable for receiving input for the performing of the functions discussed herein, such as a keyboard, mouse, click wheel, scroll wheel, microphone, touch screen, track pad, camera, optical imager, etc. The input device 220 may be configured to, for example, receive an indication that the user 102 would like to conduct an ATM transaction and transaction selections for the desired transaction, such as selection of transaction account and a type of transaction.

The computing device 108 may also include or be otherwise interfaced with a display device 222. The display device 222 may be internal to the computing device 108 or external to the computing device 108 and connected thereto via one or more connections (e.g., wired or wireless) for the transmission of data to and/or from. The display device 222 may be configured to display data to a user of the computing device 108. The display device 222 may be any type of display suitable for displaying data as part of the functions discussed herein, such as a liquid crystal display, light emitting diode display, thin film transistor display, capacitive touch display, cathode ray tube display, light projection display, etc. In some instances, the computing device 108 may include multiple display devices 222. The display device 222 may be configured to, for example, display a prompt to the user 102 requesting the user 102 make selections for an ATM transaction as well as data related thereto. In some cases, alternative output devices may be used in place of or in conjunction with the display device 222. For instance, a speaker may be used to emit an audio signal to convey data to the user 102 that is displayed on the display device 222 or as an alternative to the display device 222, such as to reduce distractions while in operation of the vehicle 106.

The computing device 108 may also include a transmitting device 224. The transmitting device 224 may be configured to transmit data over one or more networks via one or more network protocols. In some instances, the transmitting device 224 may be configured to transmit data to ATMs 104, beacons 112 and 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to ATMs 104 that are superimposed or otherwise encoded with account credentials and transaction selections. In some embodiments, the transmitting device 224 may be configured to electronically transmit data signals to third party service providers, such as for use in facilitating the providing of payment credentials to an ATM 104 separate from transmissions by the computing device 108. In some cases, the transmitting device 224 may be configured to electronically transmit data signals to beacons 112 and 114, such as may be superimposed or otherwise encoded with data requests for communicating with the ATM 104, communication information of the vehicle 106, location information of the vehicle 106, etc.

The computing device 108 may also include a memory 226. The memory 226 may be configured to store data for use by the computing device 108 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing device 108 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, program code for the vehicle application environment, ATM transaction types and transaction selection information, user interface data, predefined geographic areas, program code for identifying a geographic location, encryption and decryption keys, etc.

Process for Contactless ATM Withdrawal

Figure 3:
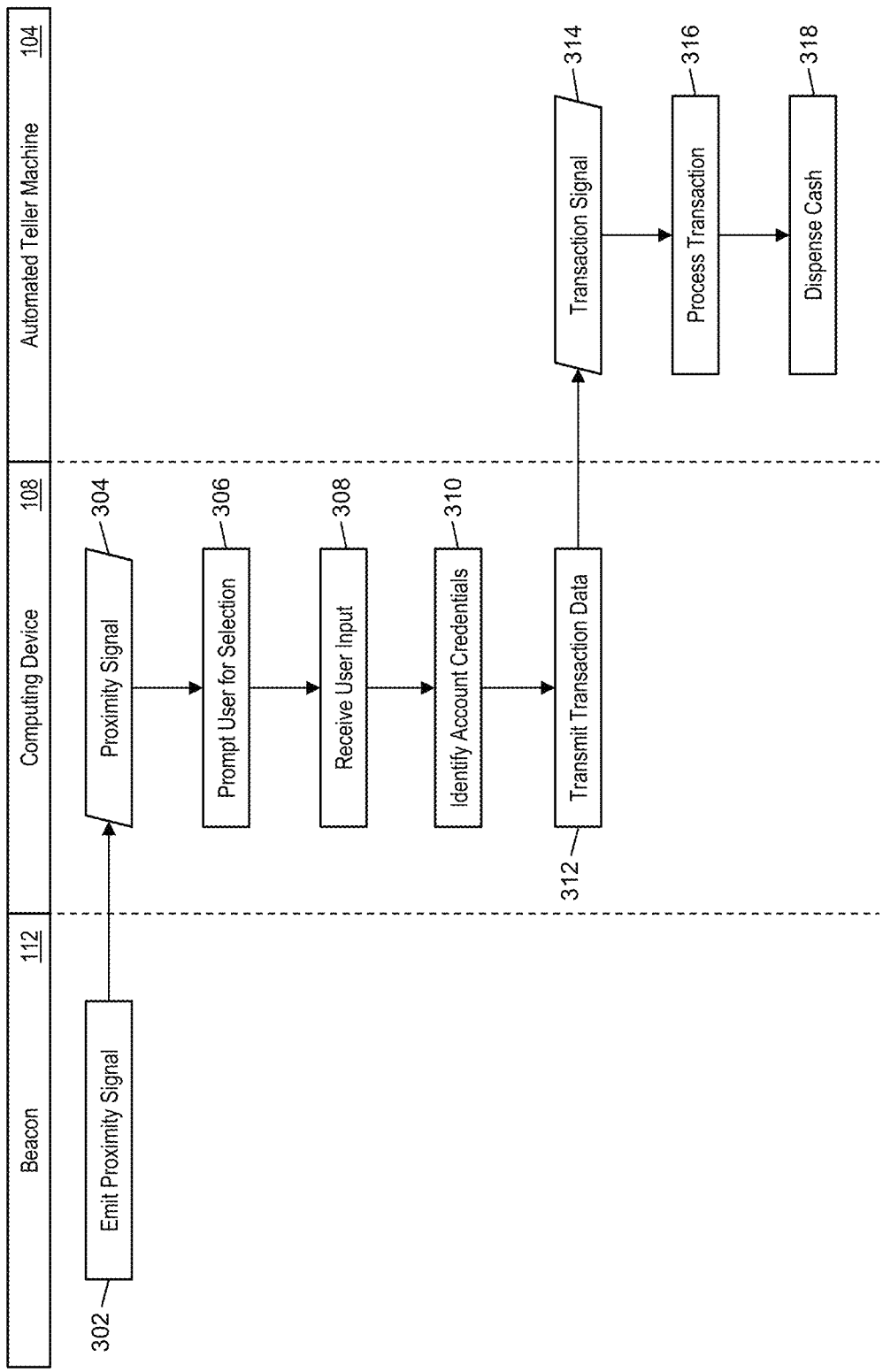
FIG. 3 is a flow diagram illustrating the processing of a contactless ATM withdrawal in the system of FIG. 1 in accordance with exemplary embodiments.

FIG. 3 illustrates an example process for the performing of a contactless withdrawal at the ATM 104 in the system 100 using the computing device 108 with geographic locations identified via the use of beacons 112 and 114.

In step 302, the beacon 112 may emit a signal that is detectable by any suitable receiving device that is within a first predefined geographic area. In some cases, the signal may be encoded with data identifying the first predefined geographic area and/or identifying the ATM 104 as being located in the first predefined geographic area. In step 304, the receiving device 202 of the computing device 108 may receive the signal from the beacon. In response to receiving the signal, in step 306, the display device 222 of the computing device 108 may display a prompt to the user 102 asking the user 102 if they would like to conduct an ATM transaction at the ATM 104. In step 308, the computing device 108 may receive selections from the user 102 for a desired ATM transaction via the input device 220 of the computing device 108. The transaction selections may include at least a selection of a transaction account, a transaction type, and any additional selections based on the transaction type.

In step 310, the querying module 218 of the computing device 108 may execute a query on the account database 206 of the computing device 108 to identify an account profile 208 that corresponds to the selection made by the user 102 to identify account credentials that are stored therein. In step 312, the transmitting device 224 of the computing device 108 may electronically transmit the transaction selections, including the identified account credentials, to the ATM 104. In some embodiments, step 312 may be initiated by the user 102 via the input device 220 of the computing device 108 upon arriving at the ATM 104. In other embodiments, the receiving device 202 of the computing device 108 may receive a signal emitted from a second beacon 114 that may initiate the transmission.

In step 314, the ATM 104 may receive the transaction selections from the computing device 108. The transaction selections may be transmitted to the ATM 104 using any suitable method, such as those discussed above. In step 316, the ATM 104 may process the desired ATM transaction using suitable methods and systems, such as by contacting an issuing financial institution associated with the selected transaction account and requesting approval for withdrawal of a specified amount. In step 318, the ATM 104 may dispense the desired amount of cash to the user 102 upon receipt of approval from the issuing financial institution.

Exemplary Method for Contactless ATM Withdrawal

Figure 4:
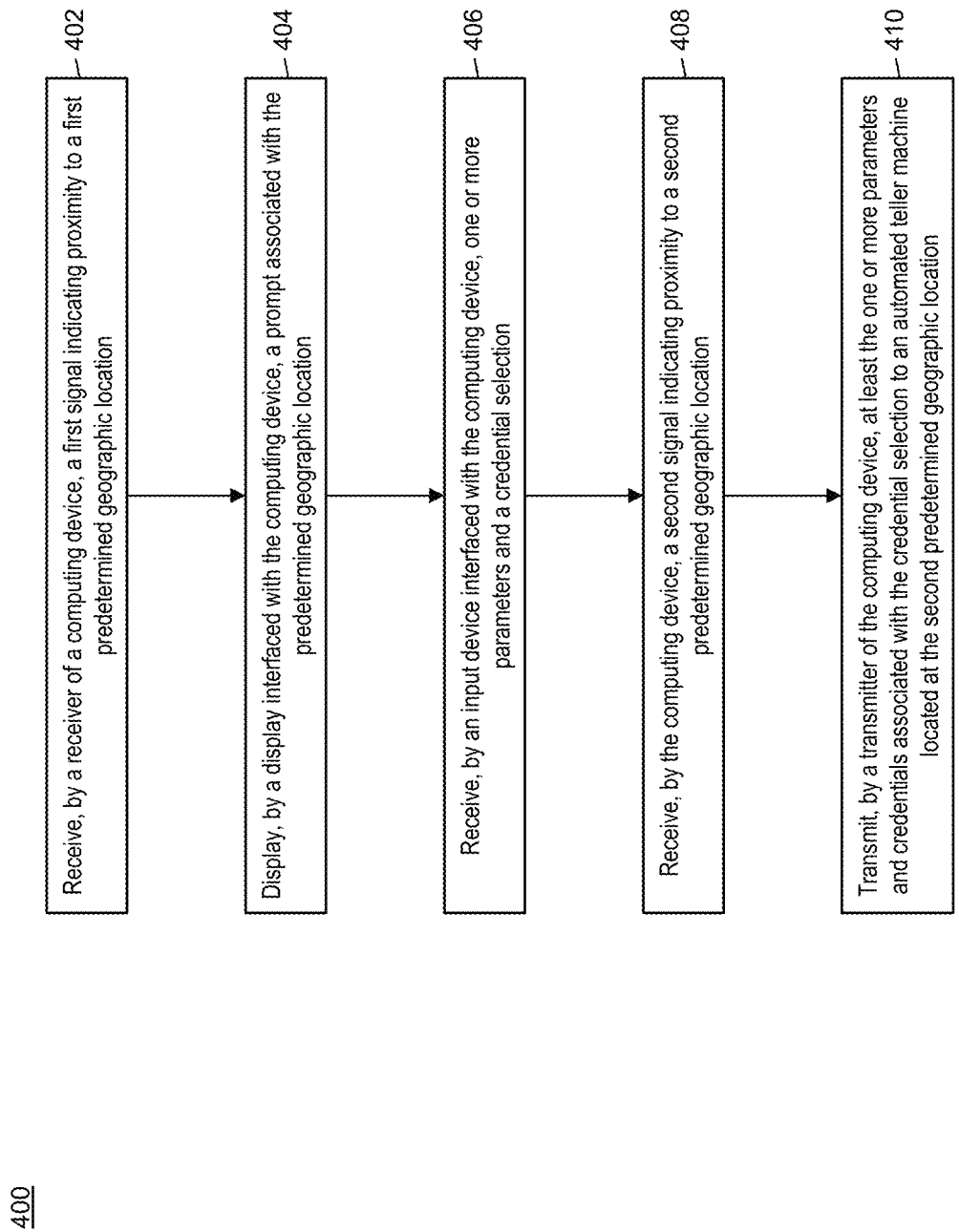
FIG. 4 is a flow chart illustrating an exemplary method for contactless withdrawal at an ATM in accordance with exemplary embodiments.

FIG. 4 illustrates a method 400 for the performing of a contactless transaction at an ATM through the use of a vehicle application environment and geographic location identification.

In step 402, a first signal indicating proximity to a first predetermined geographic location may be received by a receiver (e.g., the receiving device 202) of a computing device (e.g., the computing device 108). In step 404, a prompt associated with the predetermined geographic location may be displayed by a display (e.g., the display device 222) interfaced with the computing device. In step 406, one or more parameters and a credential selection may be received by an input device (e.g., the input device 220) of the computing device. In step 408, a second signal indicating proximity to a second predetermined geographic location may be received by the computing device. In step 410, at least the one or more parameters and credentials associated with the credential selection may be transmitted by a transmitter (e.g., the transmitting device 224) of the computing device to an automated teller machine (e.g., the ATM 104) located at the second predetermined geographic location.

In one embodiment, the first signal may be electronically transmitted by a beacon (e.g., the beacon 112) located at the first predetermined geographic location. In some embodiments, the method 400 may further include transmitting, by the transmitter of the computing device, a geographic location of the computing device to an external system, wherein the first signal is received from the external system in response to the transmitted geographic location. In one embodiment, the second signal may be electronically transmitted by a beacon (e.g., the beacon 114) located at the first predetermined geographic location or the second predetermined geographic location.

In some embodiments, the first signal may be received using a first communication channel, and the second signal may be received using a second communication channel different from the first communication channel. In one embodiment, the second signal may be received by the input device interfaced with the computing device. In some embodiments, the one or more parameters and the credentials may be transmitted using near field communication. In one embodiment, the second signal may further include a communication address, and the one or more parameters and the credentials may be transmitted to the automated teller machine using the communication address.

Computer System Architecture

Figure 5:
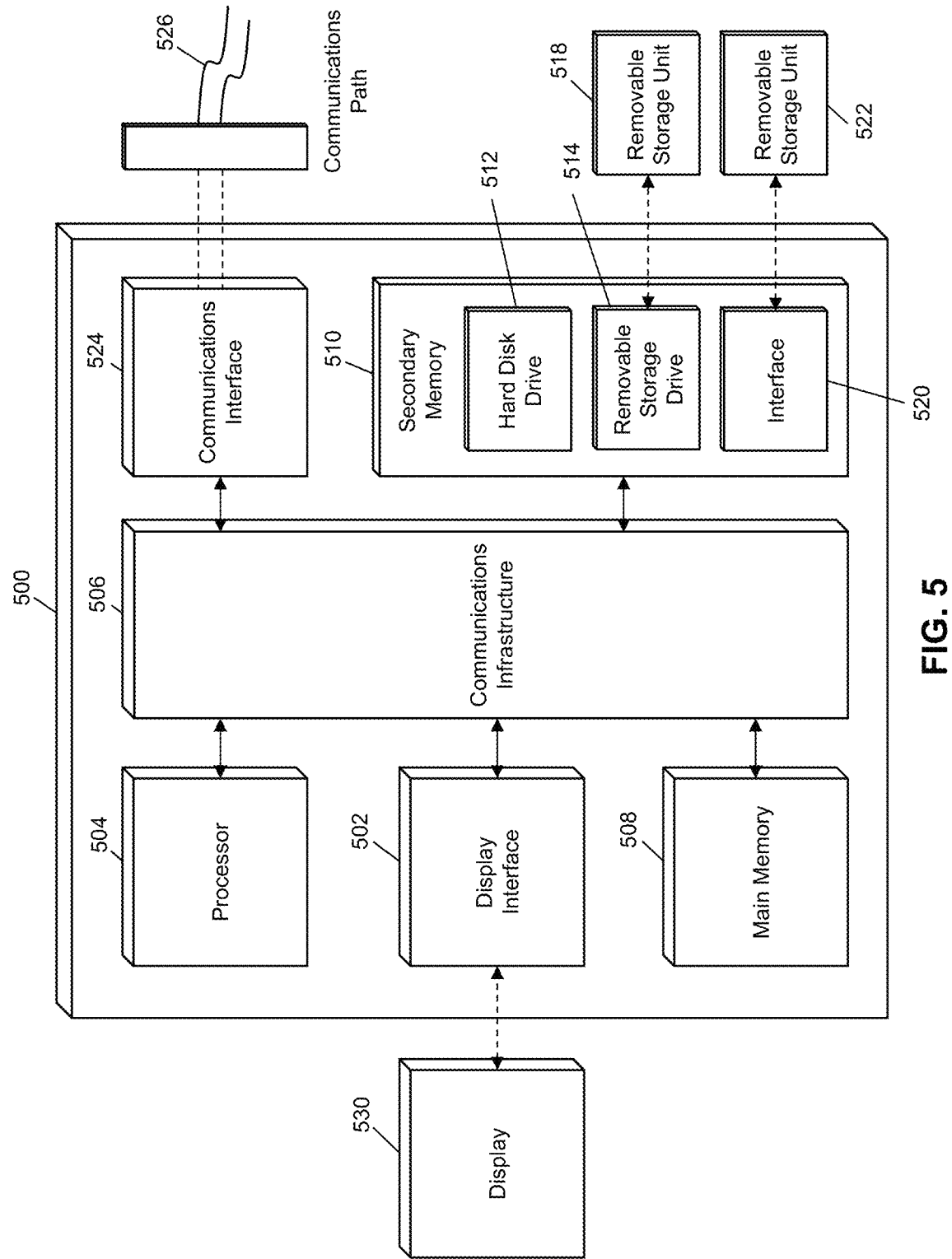
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 108 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein.

Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for hybrid payment authorization. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for contactless transaction from an automated teller machine (ATM), comprising:

receiving, by a receiver of a computing device, a first signal indicating proximity to a first predetermined geographic location, the first predetermined geographic location defining a first geographic area around the ATM, the first signal comprising encoded data identifying: (a) the first predefined geographic area, and (b) the ATM;

in response to receiving the first signal, displaying, by a display interfaced with the computing device, a prompt based on the first predetermined geographic location, the prompt including a request for the user to confirm performance of a transaction at the ATM;

receiving, by an input device interfaced with the computing device, one or more transaction selections, the transaction selections selected from the group consisting of: a transaction account, a transaction type, account credentials, and additional selections based on the transaction type;

receiving, by the computing device, a second signal indicating proximity of the user to a second predetermined geographic location, the second predefined geographic location defining a second geographic area around the ATM, wherein the second geographic area is located within closer proximity to the ATM than the first geographic area; and in response to receiving the second signal, transmitting, by a transmitter of the computing device, at least the one or more transaction selections to the ATM.

2. The method of claim 1, wherein the first signal is electronically transmitted by a beacon located at the first predetermined geographic location.

3. The method of claim 1, further comprising:
transmitting, by the transmitter of the computing device, a geographic location of the computing device to an external system, wherein
the first signal is received from the external system in response to the transmitted geographic location.

4. The method of claim 1, wherein the second signal is electronically transmitted by a beacon located at the first predetermined geographic location or the second predetermined geographic location.

5. The method of claim 1, wherein
the first signal is received using a first communication channel, and
the second signal is received using a second communication channel different from the first communication channel.

6. The method of claim 1, wherein the second signal is received by the input device interfaced with the computing device.

7. The method of claim 1, wherein the one or more transaction selections are transmitted using near field communication.

8. The method of claim 1, wherein
the second signal further includes a communication address, and
the one or more transaction selections are transmitted to the automated teller machine using the communication address.

9. The method of claim 7, wherein the near field communication is selected from a group consisting of: Bluetooth network transmission, audio signal transmission, radio frequency transmission, local area network transmission, wireless area network transmission, and cellular network transmission.

10. A system for contactless transaction from an automated teller machine (ATM), comprising:
a receiver of a computing device configured to receive a first signal indicating proximity to a first predetermined geographic location, the first predetermined geographic location defining a first geographic area around the ATM, the first signal comprising encoded data identifying: (a) the first predefined geographic area, and (b) the ATM;
a display interfaced with the computing device configured to display a prompt based on the predetermined geographic location in response to receiving the first signal, the prompt including a request for the user to confirm performance of a transaction at the ATM;
an input device interfaced with the computing device configured to receive transaction selections, the transaction selections comprising a selection of at least one of: (a) a transaction account, (b) a transaction type; (c) account credentials and (d) additional selections based on the transaction type;
the computing device configured to receive a second signal indicating proximity of the user to a second predetermined geographic location, the second predefined geographic location defining a second geographic area around the ATM, wherein the second geographic area is located within closer proximity to the ATM than the first geographic area; and
a transmitter of the computing device configured to transmit at least the one or more transaction selections to the ATM.

11. The system of claim 10, wherein the first signal is electronically transmitted by a beacon located at the first predetermined geographic location.

12. The system of claim 10, wherein
the transmitter of the computing device is further configured to transmit a geographic location of the computing device to an external system, and
the first signal is received from the external system in response to the transmitted geographic location.

13. The system of claim 10, wherein the second signal is electronically transmitted by a beacon located at the first predetermined geographic location or the second predetermined geographic location.

14. The system of claim 10, wherein
the first signal is received using a first communication channel, and
the second signal is received using a second communication channel different from the first communication channel.

15. The system of claim 10, wherein the second signal is received by the input device interfaced with the computing device.

16. The system of claim 10, wherein the one or more transaction selections are transmitted using near field communication.

17. The system of claim 10, wherein
the second signal further includes a communication address, and the one or more parameters and the credentials are transmitted to the automated teller machine using the communication address.

18. The system of claim 16, wherein the near field communication is selected from a group consisting of: Bluetooth network transmission, audio signal transmission, radio frequency transmission, local area network transmission, wireless area network transmission, and cellular network transmission.

19. A non-transitory computer readable media of a computing device having instructions stored therein operable to cause one or more processors of the computing device to execute the stored instructions to perform a method for contactless withdrawal from an automated teller machine (ATM), the method comprising:
receiving, by a receiver of a computing device, a first signal indicating proximity to a first predetermined geographic location, the first predetermined geographic location defining a first geographic area around the ATM, the first signal comprising encoded data identifying: (a) the first predefined geographic area, and (b) the ATM;
in response to receiving the first signal, displaying, by a display interfaced with the computing device, a prompt based on the first predetermined geographic location, the prompt including a request for the user to confirm performance of a transaction at the ATM;
receiving, by an input device interfaced with the computing device, one or more transaction selections, the transaction selections selected from the group consisting of: a transaction account, a transaction type, account credentials, and additional selections based on the transaction type;

receiving, by the computing device, a second signal indicating proximity of the user to a second predetermined geographic location, the second predefined geographic location defining a second geographic area around the ATM, wherein the second geographic area is located within closer proximity to the ATM than the first geographic area; and in response to receiving the second signal, transmitting, by a transmitter of the computing device, at least the one or more transaction selections to the ATM.

* * * * *